United States Patent [19]

Baltz

[11] Patent Number: 4,486,879

[45] Date of Patent: Dec. 4, 1984

[54] METHOD AND APPARATUS FOR MIXING LOW-FREQUENCY SIGNALS TRANSMITTED VIA DIFFERENT TIME SLOTS TOWARDS THE SAME TELEPHONE RECEIVER SET

[75] Inventor: Rainier Baltz, Lingolsheim, France

[73] Assignee: La Telephonie Industrielle et Commerciale Telic Alcatel, France

[21] Appl. No.: 340,391

[22] Filed: Jan. 18, 1982

[30] Foreign Application Priority Data

Jan. 21, 1981 [FR] France ................................ 81 01033

[51] Int. Cl.³ ............................................. H04M 3/56
[52] U.S. Cl. .................................. 370/62; 179/18 BC
[58] Field of Search ................ 370/62, 61; 179/18 BC

[56] References Cited

U.S. PATENT DOCUMENTS

| | | | |
|---|---|---|---|
| 3,171,896 | 3/1965 | Bartlett et al. | 370/62 |
| 3,903,372 | 9/1975 | Aro | 179/18 BC |
| 3,983,332 | 9/1976 | Patten | 179/18 BC |
| 3,997,730 | 12/1976 | Stidham | 179/18 BC |
| 4,024,349 | 5/1977 | O'Neill | 370/62 |

*Primary Examiner*—Douglas W. Olms
*Assistant Examiner*—Wellington Chin
*Attorney, Agent, or Firm*—Sughrue, Mion, Zinn, Macpeak, and Seas

[57] ABSTRACT

A plurality of PCM signal samples destined for the same telephone set are transmitted over different respective time slots of a time divided transmission link serving the telephone set. Each sample destined for the telephone set is decoded during a single time slot, the resulting decoded pulses are added together once per frame, and the sum transmitted to the telephone set for a period which is equal to the duration of one frame. The summing unit is coupled firstly to the output of a digital-to-analog converter and secondly to the input of a hold circuit. Its main components are an operational amplifier and capacitors which are suitably connected by transistors.

4 Claims, 4 Drawing Figures

METHOD AND APPARATUS FOR MIXING LOW-FREQUENCY SIGNALS TRANSMITTED VIA DIFFERENT TIME SLOTS TOWARDS THE SAME TELEPHONE RECEIVER SET

BACKGROUND OF THE INVENTION

The present invention relates to a method and apparatus for mixing low-frequency signals received in sampled digital form in different time slots of the same time-division telephone link for onward transmission to a set.

Such a method and apparatus make it possible for a single telephone receiver unit (such as an earphone or a loudspeaker) to receive signals simultaneously from several distinct signal transmitting units. For example, a tone may thus be transmitted to a telephone set which is already in use, or an operator may intervene as a third party in a call, or a single telephone may receive audio or other signals from a plurality of other telephones in a conference call.

In space-switched telephone systems where telephone audio is transmitted in the form of analog electrical signals, signals from two different telephone transmitter units (and in particular from two different telephone sets) are superposed by making Y-connections in the wires carrying the audio signals. Unfortunately this makes it difficult to satisfactorily set up a conference call between a plurality of time-switched telephone sets.

In present time-switched telephone systems, the signals generated by electronic or human sources are produced in digital form or converted thereto at telephone transmitter units, which integrate the signals into the time-switched network in which transmission takes place via physical transmission links (herein called time-division links) whose time of use is divided into frames of identical structure. These frames are subdivided into an equal number of time intervals each of which corresponds to a time slot which can be reserved for a telephone transmitter unit for the duration of the message which it is to transmit. Consequently, each telephone transmitter unit produces or converts the data to be transmitted into a succession of digital samples intended to be transmitted in a specific time slot.

Conventionally, the transmitted samples are compressed in accordance with well-defined laws so as to reduce the number of bits that need to be transmitted for reconstituting the telephone signal at a receiver unit. The disadvantage of this compression technique is that it results in the sum of two samples not itself being a decodable sample. This complicates putting a plurality of telephone transmitter units into simultaneous communication with the same receiver unit.

While it is easy to transmit signals coming from a single transmitter unit to a plurality of receiver units by duplicating each sample, it is considerably more complicated by collect together a plurality of samples coming from different telephone transmitter units for simultaneous onward transmission in the form of a single decodable sample. This has conventionally required the samples to be individually decompressed so that they can be combined by simply adding them together, followed by recompression of the sum signal to obtain a transmittable sample.

SUMMARY OF THE INVENTION

The present invention avoids the need for recompression.

In a first aspect, the present invention provides a method of mixing a plurality of low-frequency signals which are transmitted in digital sample form in respective different time slots in a single time-division telephone link for reception by a destination telephone receiver set served by said link, wherein the method includes the following steps:

successively decoding the signal samples received for said destination telephone receiver set during each frame into as many pulses as there are signal samples destined for said telephone receiver set, the values of said pulses being representative of respective ones of the received signal samples and the durations of the pulses being short relative to the duration of a frame for said link;

temporarily storing each of said pulses;

summing said stored pulses; and forwarding the resulting pulse sum towards said destination telephone set before the arrival of the first decoded pulse of the following frame.

In a second aspect, the present invention provides an apparatus for mixing a plurality of low-frequency signals which are transmitted in digital sample form in respective different time slots in a single time-division telephone link for reception by a destination telephone receiver set served by said link, said apparatus applying the above-defined method, wherein the apparatus includes a pulse summing unit which comprises at least one operational summing amplifier with a storage capacitor connected in parallel therewith, said pulse summing unit being connected via a first switching unit to the output of a decoding digital-to-analog converter which receives the samples transmitted over the link for said destination telephone receiver set and via a second switching unit to a hold circuit which produces an output signal whose value is constant for the duration of each frame, the output signal being applied to the low-frequency signal input of said destination telephone receiver set.

In other words, the present invention is advantageously applied at a "codec" interface between the digital and the analogue parts of the telephone network. The extra expense is low since: (1) codecs of the same kind are used; (2) access is already available to a plurality of time slots (usually two dozen or more) over which a plurality of digital signals can be received for mixing; and (3) mixing presents little problem in analog circuits.

BRIEF DESCRIPTION OF THE DRAWINGS

An embodiment of the invention is described by way of example with reference to the accompanying drawings, in which.

DESCRIPTION OF THE PREFERRED EMBODIMENTS

Low-frequency signals conveyed in a time-switched network, e.g. in the form of PCM samples, are mixed using the apparatus described below.

Figure 1:
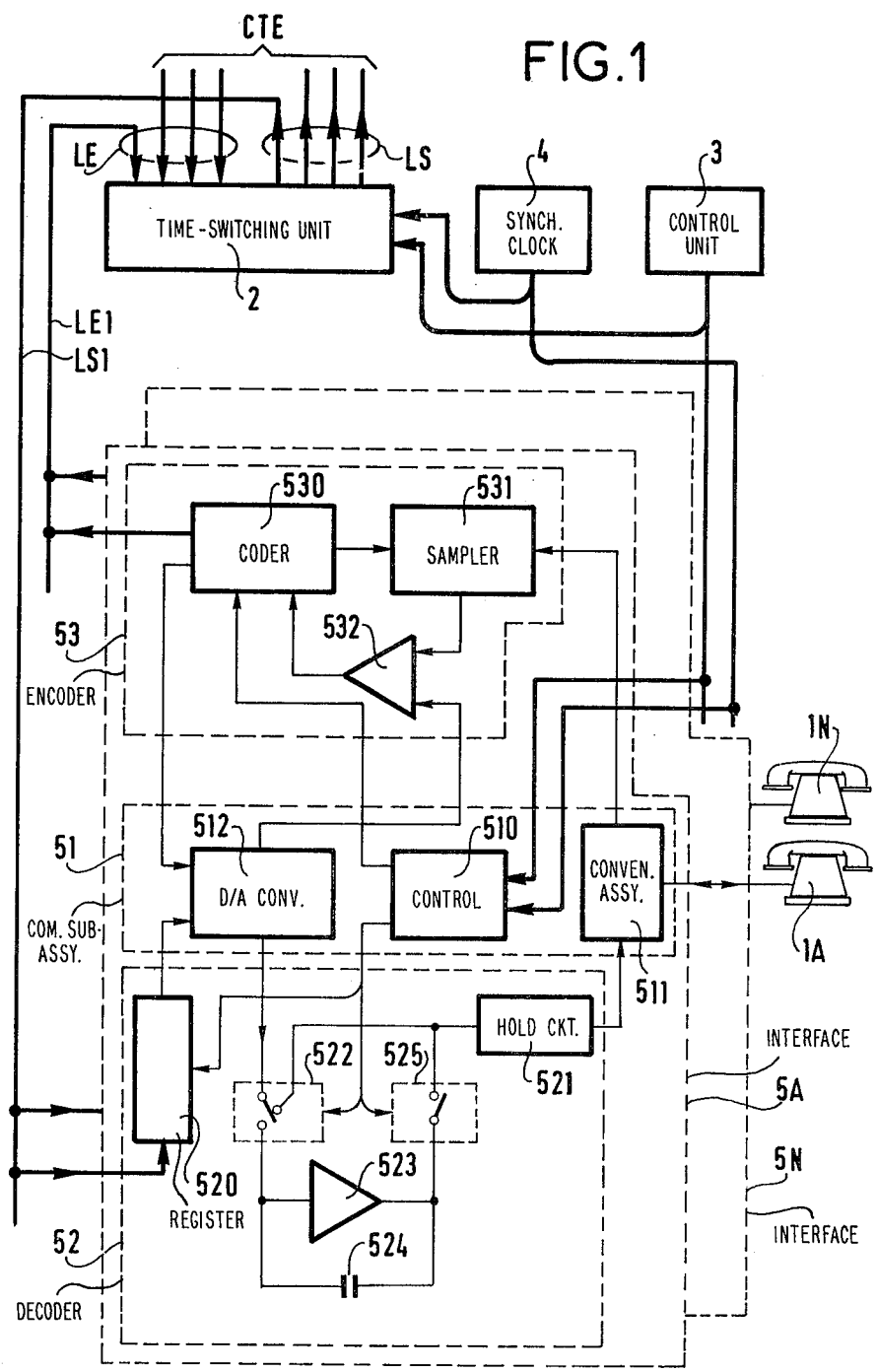
FIG. 1 is a block diagram of a time-switching coupler which includes a mixing apparatus in accordance with the invention.

FIG. 1 illustrates an example of a coupling unit equipped with the apparatus in accordance with the invention. The term coupling unit is used here to designate any equipment which time-switches samples coming from different telephone transmitter units.

A time-switching unit 2 illustrated in FIG. 1 is conventionally linked by a set of receive links LE and a set of send links LS both to local telephone sets or terminals 1A–1N served by the unit 2, and also to distant coupling units CTE which serve other telephone sets or terminals.

Conventionally, a processor-based control unit 3 (in which control may be centralized or distributed) and a synchronization clock 4 control the connecting, maintaining and disconnecting of calls to and from the telephone sets or terminals 1A to 1N which are connected to the coupling unit.

In the example illustrated in FIG. 1, a receive link LE1 and a send link LS1 are connected to telephone sets 1A to 1N by respective interfaces 5A–5N each of which comprises three major sub-assemblies, a decoder sub-assembly 52 for converting the digital signals received from the send links LS into analog signals suitable for the earphones or loudspeaker which conventionally constitute the receiver units of telephone sets or terminals; an encoder sub-assembly 53 for converting the analog signals sent from each telephone set or terminal into digital signals which can be transmitted over the receive links LE; and a common sub-assembly 51 for performing a number of functions common to the other two sub-assemblies.

The common sub-assembly 51 includes a logic control circuit 510 connected to the control unit 3 and to the clock 4 and also includes a conventional assembly 511 grouping together conventional circuits not related to the invention, e.g. circuits for protection against overvoltages and circuits for two-wire/four-wire conversion. The telephone set 1A ... 1N corresponding to a particular interface 5A ... 5N, is connected thereto via the assembly 511.

The sub-assembly 51 further includes a digital-to-analog converter 512 whose functions will be mentioned further on.

It is current practice to group together as many as possible of the functions performed by the subassemblies 51, 52, and 53 in a single integrated circuit. In particular, codecs are available in which the conversion functions performed by said sub-assemblies are grouped together in a single integrated circuit.

For example, such a codec may converts the analog electric signals which are received from a telephone set or terminal, e.g. 1A, into samples which can be transmitted on the receive link LE1, and also convert the samples which are received from the send link LS1 in successive frames into analog signals which can be used by the set or terminal 1. Conversion must of course take place in less time than one complete frame period.

The converter 512 in association with a logic circuit coder 530, a sampler 531, and a comparator 532 converts analog signals into digital samples under the control of the logic control circuit 510.

The converter 512 in association with an input register 520 and a hold circuit 521 converts digital samples into analog signals under the control of the logic control circuit 510.

In a known way, the different interfaces 5A to 5N (and consequently the different codecs from which they may be constituted) are connected in parallel to the receive links LE1 and the send links LS1 by the coder logic circuits 530 and by the input registers 520 respectively. The control unit 3 assigns time intervals to each active interface 5.

As mentioned above, each conversion takes place in a predetermined time. Producing a digital sample from an analog signal requires a coding time tc (FIG. 2) for each analogue voltage UCD, and likewise decoding a digitally coded sample into an analogue voltage pulse UDCD requires a decoding time td. Depending on whether use is made of some components for both types of conversion (e.g. the digtal-to-analog converter 512), it may be necessary to prevent coding and decoding operations from overlapping within the same interface.

In the case of high-performance codecs the times tc and td are short relative to the duration of a transmission frame and there remains time during each frame for which the codec is inactive. This inactive time may be used for other operations and in particular to decode more than one digital sample. This allows the same receiver to be linked to several transmitter units provided they transmit on time slots which are separated from one another by periods longer than the decoding time of the codec which serves the receiver.

However, receiver units are generally not adapted to receive a plurality of signals simultaneously; in particular, earphones or loudspeakers do not provide understandable reproduction of signals which are submitted to them simultaneously. The problem includes overloading and the resulting distortion.

In most cases where simultaneous reception is envisaged, steps are taken to give preference temporarily to one received signal to the detriment of the others; e.g. by temporarily attenuating the other signals relative to the preferred signal, as in third-party intervention by an operator, or else by freely accepted discipline as in the case of conference connection.

Figure 2:
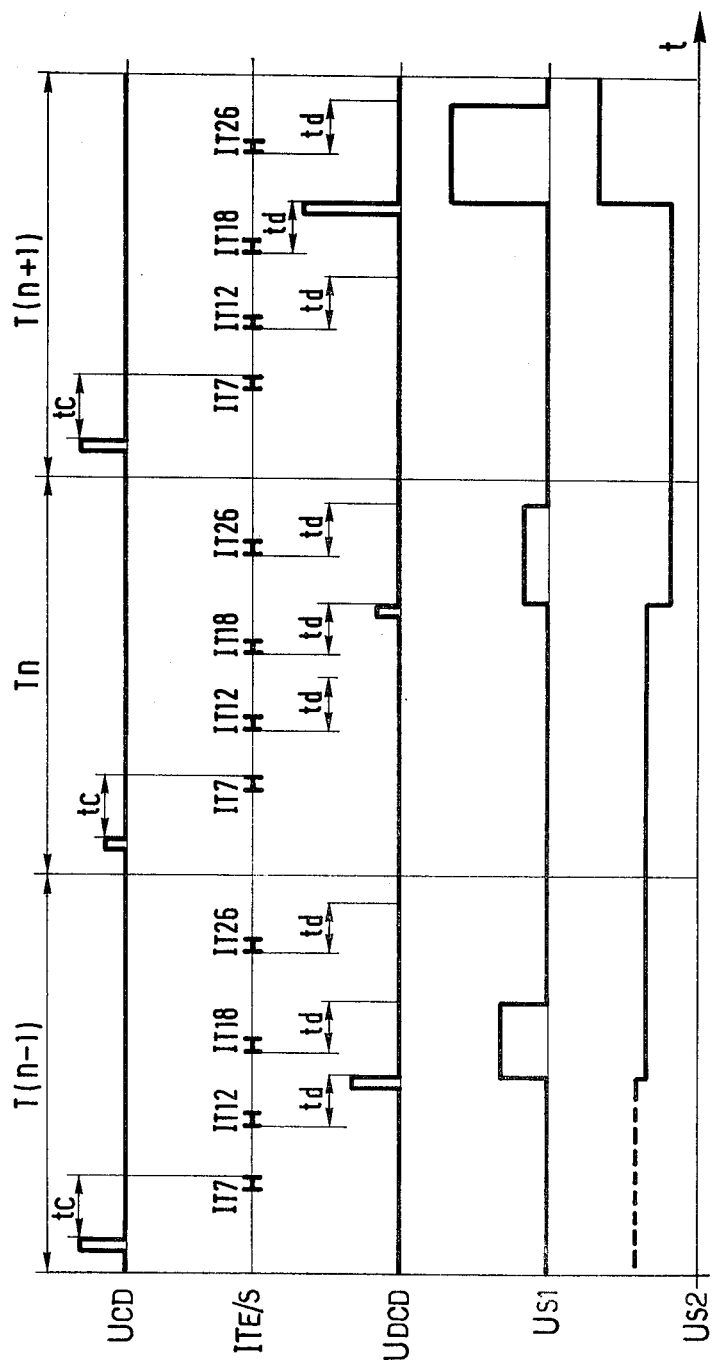
FIG. 2 is a timing diagram which schematically shows the operation principle of the mixing apparatus in accordance with the invention.

Thus, all but one of the signals received and decoded by the codec generally correspond to silence. FIG. 2 illustrates an example which applies to a codec sending during a time slot V7, which corresponds to a time interval IT7, and receiving during time slots V12, V18, V26 corresponding respectively to time intervals IT12, IT18 and IT26. Provided the codec is suitable for producing three pulses of different voltages from the samples received at times IT12, IT18 and IT26, the earphone or the loudspeaker connected to the codec either receives three successive voltage levels during one frame, or else it receives the first of these levels, depending on the kind of hold circuit 521.

If it is assumed, for example, that only the subscriber using time slot V12 is speaking and that the subscribers using time slots V18 and V26 remain silent at a given time, the samples obtained from time slots V18 and V26 during this time correspond to voltage signals of zero value and only the time slot V12 supplies voltage pulses. If the hold circuit 521 were energized for each of the time slots V12, V18, V26, it would then produce voltage signals whose duration is practically equal to the time which separates time slot V12 from time slot V18 as shown by the curve US1.

While it would still be possible to obtain a suitable signal at a telephone 1A thus served, providing suitable precautions were taken, it is nonetheless true that if such precautions were not taken, the transmitted signals US1 do not allow faithful reproduction of the original signals.

That is why a time slot mixer unit is provided to sum the pulses. This mixer unit is inserted between the decoder output of the digital-to-analog converter 512 and the input of the hold circuit 521 so as to avoid wrongly cancelling significant voltages at the input of the hold circuit.

Consequently, as shown by the curve US2, as the successive frames progrss, there still subsists a representative voltage at the input of the hold circuit 521 as long as one of the time slots V12, V18 or V26 produces a sample which does not correspond to silence.

The digital-to-analog converter 512 is connected to a bistable switching unit 522 which directly links the hold circuit 521 to the converter 512 while the telephone 1A is receiving via a single time slot only in accordance with the conventional process.

When the logic control circuit 510 receives an order to mix low-frequency signals coming from a plurality of time slots, e.g. V12, V18 and V26, and to send the mixed signal to the telephone 1A, it sets the switching unit 522 to its second stable position so as to switch a summing unit into the circuit. The main components of the summing unit are an operational amplifier 523 across whose input and output terminals a capacitor 524 is connected to store the voltage pulses received and to sum them as they arrive.

A second switching unit 525 is inserted between the input of the hold circuit 521 and the output of the operational amplifier 523 so as to apply the sum voltage to the input of the hold circuit 521 at a predetermined instant in each frame. This instant may, for example, be during the time tc reserved for coding. The hold circuit is then set to the corresponding voltage value for the duration of the following frame. This is done either by using a monostable type hold circuit 521 or by using a hold circuit 521 controlled directly by the logic control circuit 510.

Figure 3:
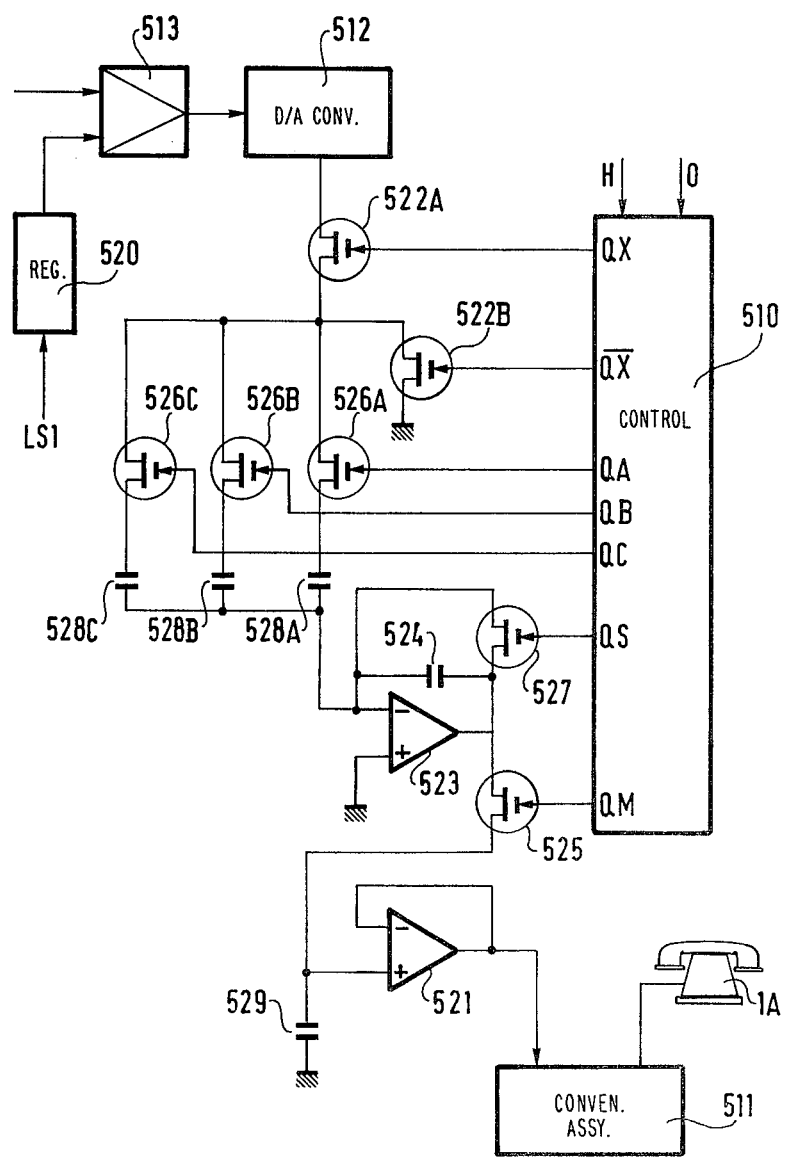
FIG. 3 is a more detailed circuit diagram of the apparatus in accordance with the invention.

In FIG. 3, some of the conventional components described hereinabove re-appear. In particular the analog-to-digital converter 512 is linked via a multiplexer 513 to the output of the input register 520 to which the send links LS1 are connected. The telephone set 1A and the assembly 511 are also shown. The assembly 511 is connected to the hold circuit 521 (here constituted by an operational amplifier whose output is connected to its inverting input and whose non-inverting input is connected to ground via a capacitor 529 in a conventional configuration).

Likewise, there is shown the logic control circuit 510 and the operational amplifier 523 which, with the capacitor 524, is the main component of the summing assembly.

The decoded pulses output from the digital-to-analog converter 512 is connected to a transistor 522A (here of the CMOS type so that it can be integrated in a circuit of the same kind as the other components mentioned here). The transistor 522A is controlled by a signal QX from the logic control circuit 510 and is thereby made conductive so that it transmits the decoded pulses.

The transistor 522A is connected to a plurality (three in the present case) of transistors 526A to 526C each intended to cause one decoded pulse to be stored during a frame for summing. Accordingly, each of the transistors 526A to 526C is inserted between the transistor 522A and a respective capacitor 528A to 528C, and each of them is controlled by a respective signal QA, QB or QC sent from the logic control circuit 510. In the example illustrated it is possible to establish simultaneous communication from three telephone sets or transmitter units to the telephone set 1A. The control outputs QA, QB, QC to the transistors 526A, 526B, 526C are enabled by the logic control unit so as to charge each of the capacitors 528A to 528C with a voltage pulse derived from a corresponding time slot, e.g. V12 for 528A, V17 for 528B and V26 for 528C.

It will be observed that this configuration can be used in the case of set-to-set calling and corresponds practically to the first stable state of the switching unit 522 described in relation to FIG. 1.

The capacitors 528 are also linked by their second terminals to the inverting input of the operational amplifier 523 which is itself connected to one of the terminals of the capacitor 524, whose other terminal is connected to the output of the amplifier 523 in a conventional arrangement.

A transistor 527 controlled by a signal QS sent by the logic control circuit 510 can short-circuit the capacitor 524 so it may be discharged.

A transistor 525 controlled by a signal QM is inserted between the output of the summing amplifier 523 and the point which is common to the non-reversing input of the hold amplifier 521 and to the capacitor 529 so as to apply the obtained sum voltage US2 to this point. The voltage US2 conventionally has the form:

$$US2 = -\frac{CS}{CA}(UA + UB + UC)$$

where CS is the capacitance of the capacitor 524, CA is the capacitance common to the capacitors 528A, 528B and 528C and UA, UB and UC are the voltages at the terminals of these capacitors, and providing the charging and discharging times of the capacitors are appropriate.

In practice, when a call is set up, the capacitors 524 and 528 are discharged via a transistor 522B enabled oppositely to transistor 522A by a control signal $\overline{QX}$ which is present at a time "tdc" (see FIG. 4) while the samples which come from the telephone set 1A are being encoded.

The first sample to appear during a frame Tn−1, e.g. in time slot V12, is applied to capacitor 528A via transistors 522A and 526A in the conductive state while the transistors 526B, 526C and 527 are non-conductive. The transmitted pulse is therefore stored in the capacitor 528A in the form of a voltage UA and the transistor 526A is turned off after a delay which corresponds to the required charging time.

The second and third samples are charged in an identical way on capacitors 528B and 528C in the form of voltages UB and UC.

After charging the last expected pulse for the frame T(n−1) the logic control circuit turns off the transistor 522A, temporarily disconnecting the summing circuitry from the converter 512. The above-mentioned voltage US2 is obtained at the terminals of the summing amplifier 523 when the transistors 522B, 526A, 526B, 526C conduct at the time tt. When summing has been performed, the transistor 525 is turned on at a time ts and transmits the sum voltage to the terminals of the load capacitor 529 of the amplifier 521, which holds the sum voltage UP at the input of the assembly 511 until the next time the transistor 525 is conductive, i.e. during the following frame Tn.

Then the capacitors 524 and 528 are discharged by transistors 522B, 526A, 526B, 526C and 527 all conducting at the time tdc, which occurs during the encoding phase for the samples sent by the telephone set 1A during frame Tn.

Figure 4:
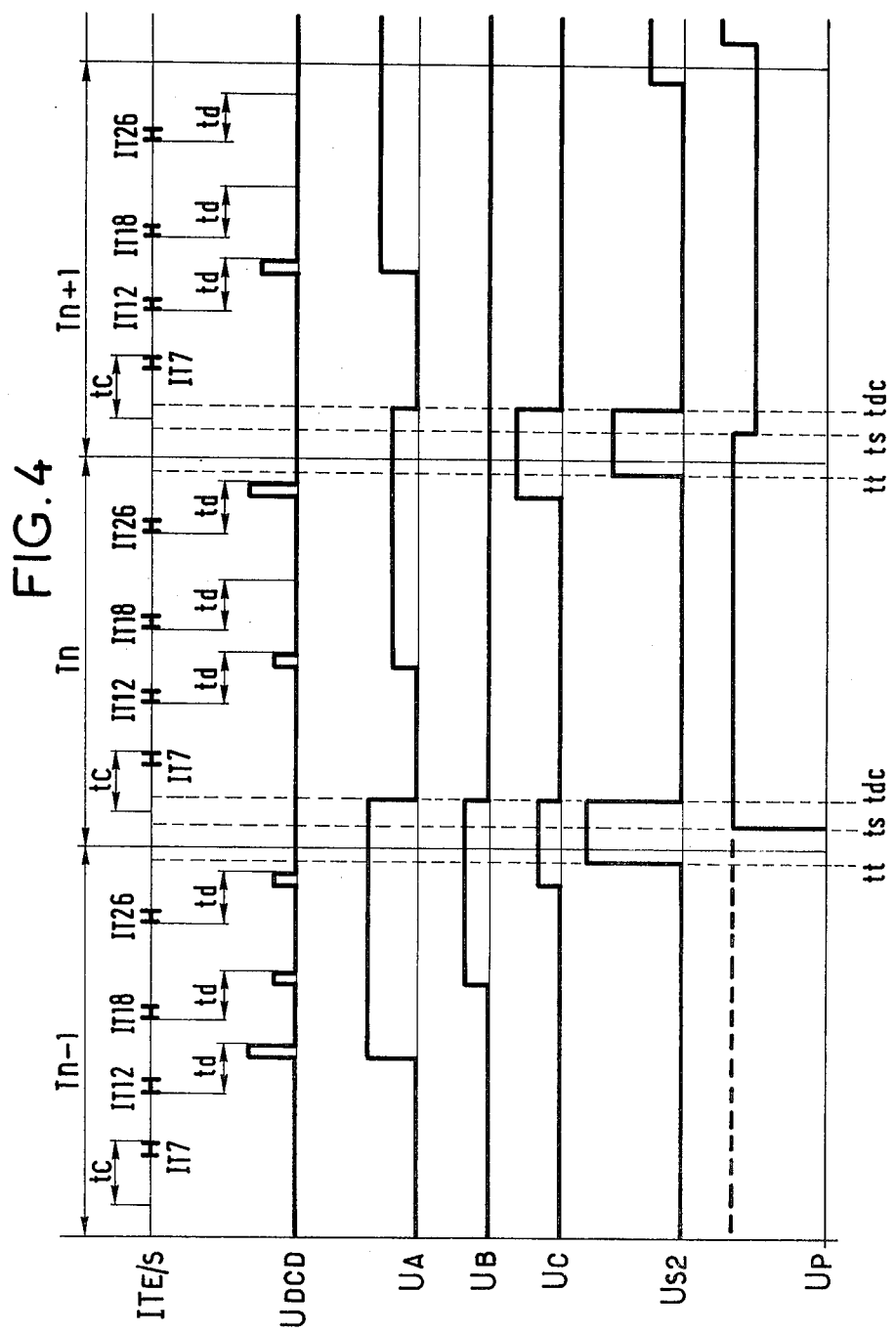
FIG. 4 is a timing diagram for the apparatus shown in FIG. 3.

As shown by FIG. 4, this ensures that the voltage UP is other than zero during each frame, providing at least one of the samples decoded during the preceding frame was not zero.

I claim:

1. A method of mixing a plurality of low-frequency signals which are transmitted in digital sample form over respective different time slots in a single time-divided telephone link for reception by a destination telephone receiver set served by said link, wherein the method includes the following steps:

successively, at a telephone set interface for each said telephone receiver set, decoding the signal samples received for said destination telephone receiver set during each time frame into an many pulses as there are signal samples destined for said telephone receiver set, the values of said pulses being representative of respective ones of the received signal samples and the durations of said pulses being short relative to the duration of a frame for said link;

temporarily storing each of said pulses at said telephone set interface;

summing said stored pulses at said telephone set interface; and forwarding the resulting pulse sum from said telephone set interface to said destination telephone set before the arrival of a first decoded pulse of a following frame.

2. An apparatus for mixing a plurality of low frequency signals transmitted in digital sample form over respective different time slots in a single time-divided telephone link for reception by a destination telephone receiver set served by said link, said apparatus including, for each said telephone receiver set, an interface comprising a pulse summing unit comprising at least one operational summing amplifier and a storage capacitor connected in parallel therewith; a first switching unit; a decoding digital-to-analog converter; a second switching unit; and a hold circuit; wherein said pulse summing unit is connected via said first switching unit to an output of said decoding digital-to-analog converter, said digital-to-analog converter receiving the samples transmitted over said link for said destination telephone receiver set and transmitting said samples in digital form via said second switching unit to said hold circuit, which in response to said digital samples produces an output signal whose value is constant for the duration of each frame, said output signal being applied to a low-frequency signal input of said destination telephone receiver set.

3. The apparatus according to claim 2, further including a discharge transistor coupled in parallel with said storage capacitor; and at least two parallel supply circuits, each of which includes a switching transistor connected in series with a transmission capacitor, one end of each of said parallel supply circuits being connected to said digital-to-analog converter and the other end of each of said parallel supply circuits being connected to the same input of the operational amplifier as said storage capacitor.

4. The apparatus according to claim 3, wherein said first switching unit comprises a transistor inserted between said digital-to-analog converter and said one end of the parallel supply circuits; wherein said second switching unit comprises a transistor inserted between the output of the operational summing amplifier and a control input of said hold circuit; wherein said hold circuit comprises a second operational amplifier whose output is fed back to an inverting input thereof and whose non-inverting input is said control input which is also connected to a second storage capacitor; and wherein the apparatus further comprises a transmission capacitor discharge transistor controlled in phase opposition to said transistor of said first switching unit.

* * * * *